Aug. 3, 1954 W. J. CURTIN 2,685,614

TELEPHONE ANSWERING SYSTEM

Filed July 2, 1952 4 Sheets-Sheet 1

INVENTOR.
William J. Curtin,

BY Joseph G. Werner

ATTORNEY

Aug. 3, 1954 W. J. CURTIN 2,685,614

TELEPHONE ANSWERING SYSTEM

Filed July 2, 1952 4 Sheets-Sheet 2

INVENTOR.
William J. Curtin,

BY Joseph G. Werner

ATTORNEY

Aug. 3, 1954 W. J. CURTIN 2,685,614

TELEPHONE ANSWERING SYSTEM

Filed July 2, 1952 4 Sheets-Sheet 3

INVENTOR.
William J. Curtin,

BY Joseph G. Werner

ATTORNEY

Aug. 3, 1954 W. J. CURTIN 2,685,614

TELEPHONE ANSWERING SYSTEM

Filed July 2, 1952 4 Sheets-Sheet 4

INVENTOR

William J. Curtin,

BY Joseph G. Werner

ATTORNEY

Patented Aug. 3, 1954 2,685,614

UNITED STATES PATENT OFFICE 2,685,614

TELEPHONE ANSWERING SYSTEM

William J. Curtin, Madison, Wis.

Application July 2, 1952, Serial No. 296,788

11 Claims. (Cl. 179—1)

This invention relates to a telephone answering system or service, and more particularly to such a system adapted to be employed in conjunction with a central telephone exchange and one or more branch telephone exchanges.

A primary object of this invention is the provision of an improved system whereby two or more telephone exchange areas may be served by a single telephone answering office.

A further object of the invention is the provision of such a system which materially reduces the complexity and expense normally incident to a telephone answering service which utilizes two or more telephone exchanges.

As conducive to a clearer understanding of this invention, it may here be pointed out that a telephone answering service is a system which answers telephones for businesses, professional offices and private individuals by linking their telephones with an answering service office. The telephones of the subscribers or clients are connected to the answering service office by wires extended from the clients' terminations in the telephone company offices to the equipment of the telephone answering service. Normally a telephone answering system functions as a separate enterprise from the standard telephone company.

A telephone company charges a telephone answering service a graduated rate for telephone extension wires, increasing this rate directly in proportion to the distance between the telephone company exchange and the telephone answering office. This varies from city to city and from one section of the country to another. The rates, however, are sufficiently high to make it expedient for the telephone answering service in using the extension wires of the telephone company to locate its equipment as close to the telephone exchange as possible. Usually by locating within a one-quarter mile radius, the telephone answering service gains the advantage of the minimum base rate for the rental of the telephone extension wires, making it possible to provide telephone answering service for its clients at a reasonable rate and with a minimum overhead.

As long as the telephone company in a given city operates from a single central exchange, the telephone answering service located in close proximity, can function with no difficulty. But it is when the telephone company establishes new exchange centers in other sections of the city, that the problem of highly expensive extension wire rentals presents a serious difficulty. The telephone answering service is now cut off from its clients in the new sub-division and is faced with the problem of re-establishing contact with them. It is faced with two obstacles—one economic, the other technical. On the economic side, to establish a completely independent telephone answering service sub-division is at once a great financial burden, not warranted, perhaps, by the number of potential clients in the new telephone district. To run extension wires from the new telephone exchange to the central telephone answering service office is also a highly expensive operation. Neither solution is feasible economically.

On the technical side a solution of the problem depends upon the development of equipment which will enable the central telephone answering service office to bridge the gap to its clients in the new telephone exchange sub-division. In other words, a system had to be devised whereby the central telephone answering service office could keep in contact with its clients in the new sub-division without an undue increase in the cost of operation. It is with the solution of this technical problem that the present invention is concerned.

This invention is also concerned with making it economically and technically feasible for providing telephone answering service to smaller communities and suburban areas where the number of potential clients does not warrant the establishment of the conventional answering service system. The present invention also makes it feasible to provide telephone answering service to areas of urban communities which are largely residential and have not been given such service for the reasons above stated.

A very important object of the invention is therefore the provision of a system whereby a telephone answering service client's telephone can be answered even though the client's phone is in the area normally cut off from the telephone answering service central office by the new telephone sub-division or in an area where it has not been feasible to render such service. The means whereby this is accomplished is a synchronizing mechanism located in the vicinity of the new telephone exchange in combination with standard telephone company equipment, such as the selector-connector. The synchronizing mechanism provides the central telephone answering system's office with the precise identification of telephone clients in a remote exchange whose telephone is being rung with a minimum of wire rental, namely a dial-talk circuit and a signal circuit, instead of multiple circuits or a trunking system as is used in conventional telephony. The identification may be accomplished either indirectly by electronic-mechanical means or directly by direct contact with the telephone company's equipment. The indirect means has been found to be particularly feasible where the telephone answering service is not permitted or able to make direct contact with the equipment of the telephone company.

By the electronic-mechanical means, when a telephone is rung in a branch telephone exchange, which is to be answered by the telephone answering system, a light, one light being provided for each client's telephone, glows on a panel in the telephone answering system's branch exchange located in close proximity to that particular telephone branch exchange. A scanning mechanism, essentially a photo-electric cell unit in combination with a synchronized electric motor, picks up the position of the glowing light and transmits an impulse over a single circuit to a similar synchronized apparatus in the telephone answering service central exchange. In the telephone answering service central exchange the telephone secretary faces a corresponding panel of lights and when one of the lights glows on the panel, she simply dials the number corresponding to the glowing lamp. When the number is dialed, the telephone relay in the telephone answering system's branch exchange is activated (via a 2-wire circuit between central telephone answering exchange and the branch telephone answering service exchange) and the client's phone can now be answered.

In effect, the system of the present invention enables the telephone secretary in the central telephone answering service exchange to see the panel of lights in any of the telephone answering service branch exchanges. Thus, she can identify the particular client's phone and answer any calls coming into that phone by dialing the client's position on the selector-connector switch. No telephone secretaries are required in the telephone answering branch exchanges.

By direct contact with the telephone company's equipment, whereby the telephone answering system is linked directly with the telephone exchanges, a simplified means, obviating photo-electric cells and synchronized motors, is possible.

A further object of the present invention is to provide a telephone answering system for a community having multiple telephone exchanges wherein the greatest economy in overhead may be possible. Using the present invention, wire rentals and office space may be kept at a minimum, without secretaries at branch telephone answering service exchanges, while central control increases the all-over efficiency to a peak.

The invention, accordingly, consists in the features of construction, combination of elements, and arrangement of parts, as will be exemplified in the structure to be hereinafter described and the scope of the application of which will be indicated in the following claims.

In the accompanying drawings in which are shown two of the possible embodiments of my invention:

Similar reference characters refer to similar parts throughout the several views of the drawings.

Figure 1:
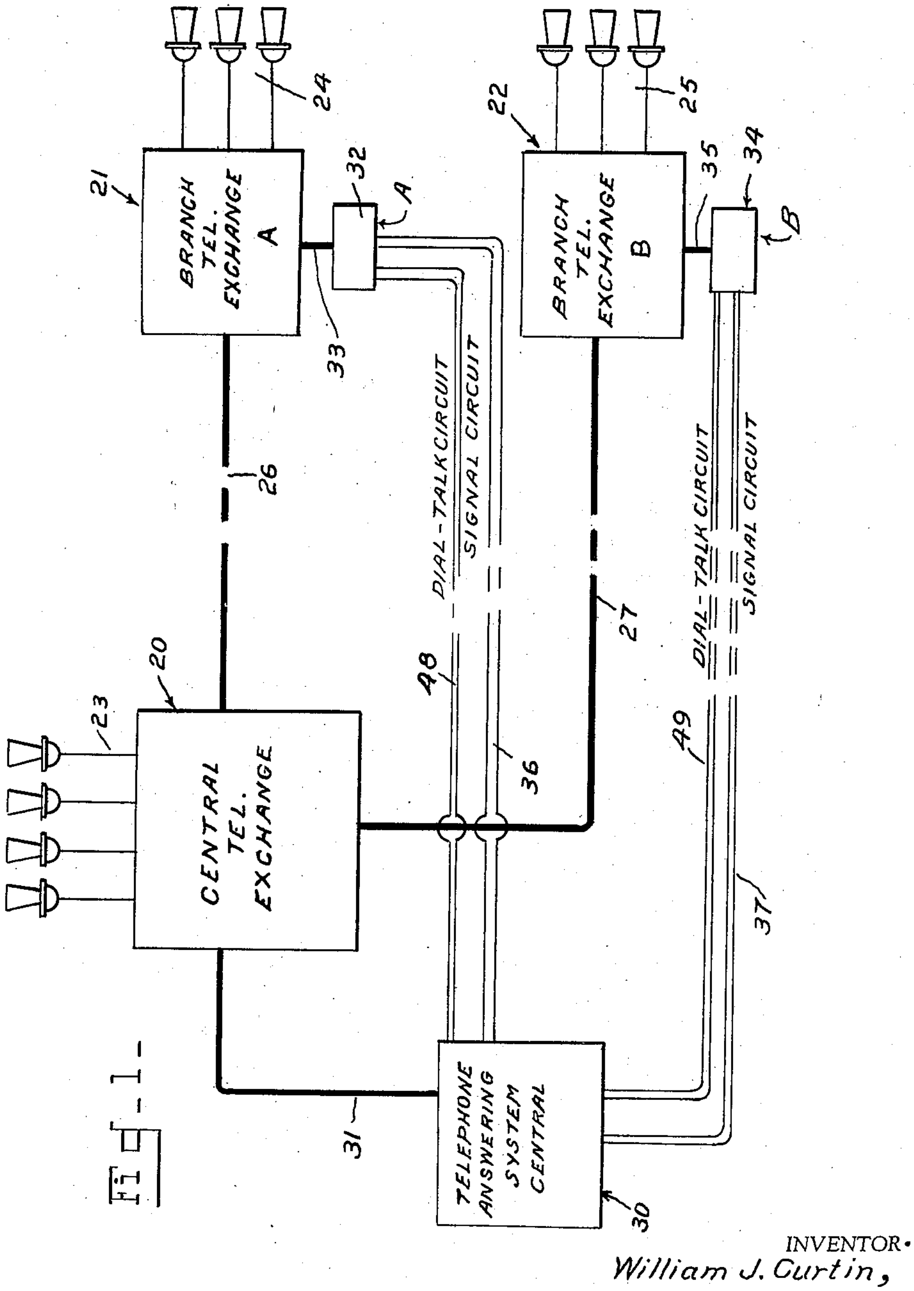
Fig. 1 is a schematic diagram of one form of system embodying this invention.

Having reference now to the drawings in detail and more particularly to Fig. 1, there is generally indicated at 20 a central telephone exchange of any standard conventional type or system. At 21 there is indicated a conventional branch telephone exchange "A," and at 22 a similar branch telephone "B." Into each of these telephone exchanges lead lines 23, 24 and 25, respectively, schematically illustrating the lines from individual subscribers. A main cable, or cables, 26, of the multiple circuit type connects the central telephone exchange 20 with branch telephone exchange "A," 21, while a second cable or series of cables 27 of similar type connects central telephone exchange 20 with branch telephone exchange "B," 22. All of the above are schematically illustrative of any conventional telephone system utilizing a plurality of exchanges.

There is generally designated 30, a central telephone answering exchange employing secretarial boards and other conventional facilities, to which the subscriber's or client's lines are led directly through a multiple circuit cable 31, the central telephone answering exchange board being located as closely adjacent to the central telephone exchange as possible for reasons previously set forth.

Closely adjacent branch telephone exchange "A" there is located a branch telephone answering exchange "A," 32, a multiple circuit connecting cable 33 connecting branch 32 with telephone branch 21. Correspondingly, there is located closely adjacent branch telephone exchange "B," 22, a branch telephone answering service exchange "B," 34. The customary connection 35 connects telephone branch 22 with branch 34.

Branch telephone answering exchanges 32 and 34 are provided with scanning units of any desired conventional type as will be more fully described hereinafter. The scanning units in these branch answering exchanges 32 and 34 are connected to signal receiving means in the central telephone answering exchange 30 by signal circuits 36 and 37. In addition, branch telephone answering exchanges, 32 and 34, are connected to the central telephone answering exchange 30 by dial-talk circuits 48 and 49.

Figure 2:
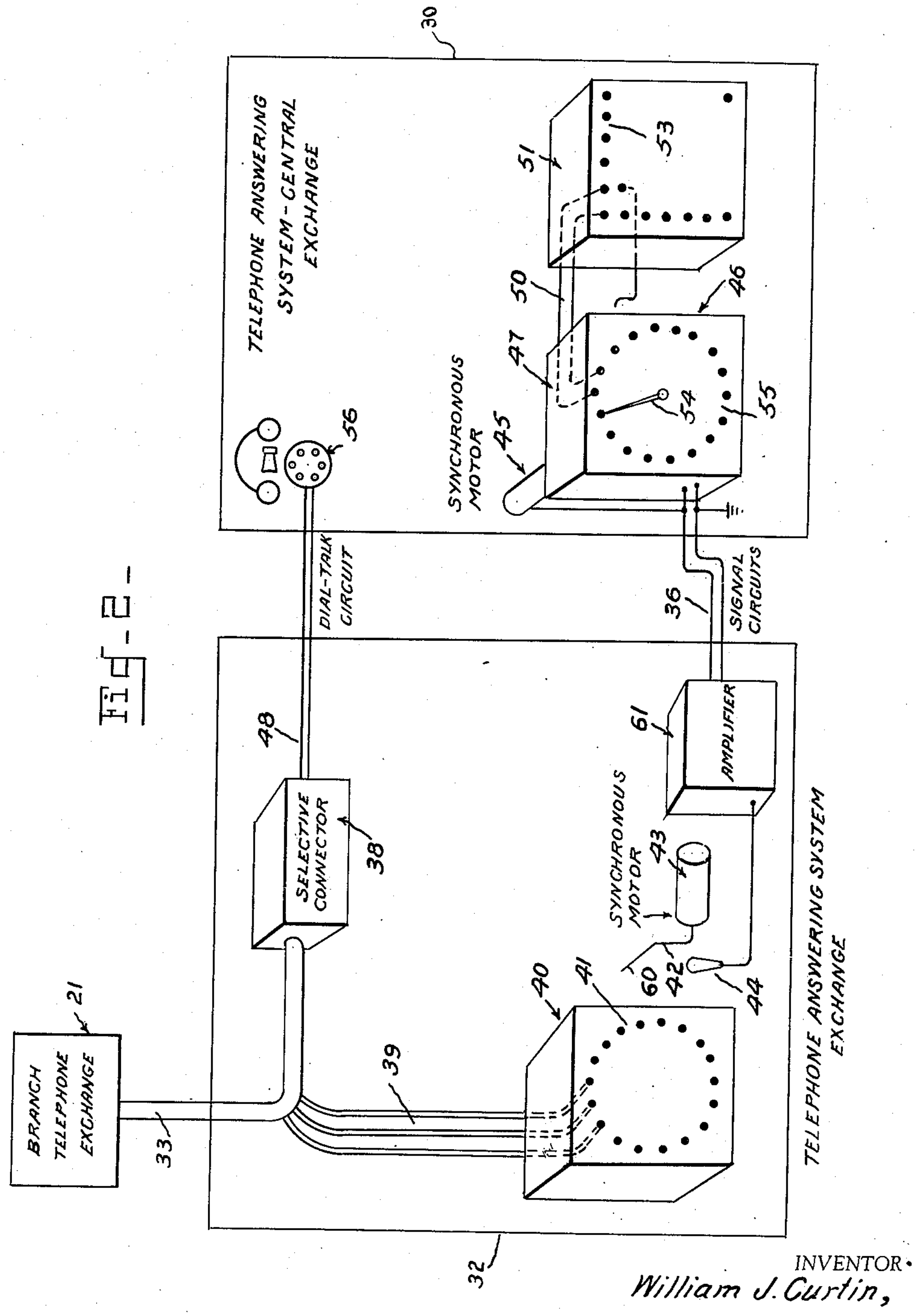
Fig. 2 is a schematic view showing the relationship and interconnection of the central telephone answering system board and the branch telephone answering system exchange.

Having reference now particularly to Fig. 2 the central telephone answering exchange is schematically illustrated at 30 while the telephone answering system's branch exchange "A" is illustrated at 32. The relationship of branch telephone answering exchange 34 being identical with that of branch 32 is not illustrated. Branch telephone exchange "A" is schematically illustrated at 21 while telephone branch exchange "B" is not shown inasmuch as its operation is identical to telephone branch exchange "A." As noted above, branch telephone exchange "A," 21, is connected to branch telephone answering exchange 32 by means of a multiple circuit connecting cable 33. Cable 33, in turn, is connected to a selector-connector 38, standard telephone equipment and too well known to elaborate thereon here, within the branch telephone answering exchange 32. Within the branch 32 there is located a board 40 provided with a plurality of individually and selectively illuminable lights 41, and connected to the selector-connector 38 by means of conventional type jumper wires 39. Any desired conventional photo-electric scanning unit is associated with board 40. For the purpose of illustration this unit is schematically illustrated merely as a scanning arm 42, having a reflecting surface 60 at its outer end, connected to a synchronous electric motor 43 and associated with a photo-electric cell 44. This scanning unit is connected to an amplifier 61 of any conventional type and there through to signal circuit 36 to signal receiving means, hereinafter described in detail within the central telephone answering exchange 30.

Within the central telephone answering system's office 30, signal circuit wires 36 are connected to a motor 45, synchronized with synchronous motor 43 within branch 32. Synchronous motor 45 drives a brush 54 on a commutator 55, the commutator having contacts 46 for each subscriber to the telephone answering system's service within exchange "A," 21. These contacts 46 of commutator 55 are generally indicated on box 47, corresponding in position to lights 41 of board 40 in branch 32. Points 46 are then connected by means of jumper wires 50 to a board 51 having illuminable lights 53.

The operation of a photo-electric scanning unit is generally so well known as to need no description here, particularly in view of the fact that any one of a large number of such units may be employed for the purpose of the instant system. In the operation of the device, obviously, when light 41 is illuminated the illumination activates photo-electric cell 44 and the emergent signal is amplified by amplifier 61, and is transmitted through signal circuit 36, which through signal receiving means including synchronous motor 45, its brush and contacts on its commutator, and box 47, which are distributed to illuminate corresponding lights 53. Thus the telephone secretary of central telephone answering exchange 30 is immediately informed of the precise subscriber to the telephone answering service whose telephone is to be answered. A dial-talk circuit 48 between the selector-connector 38 within branch 32 and the central telephone answering service exchange 30 includes a dial telephone generally indicated at 56. The telephone secretary for the telephone answering service may then directly answer the subscriber's or client's telephone using the equipment provided by the telephone company.

Figure 3:
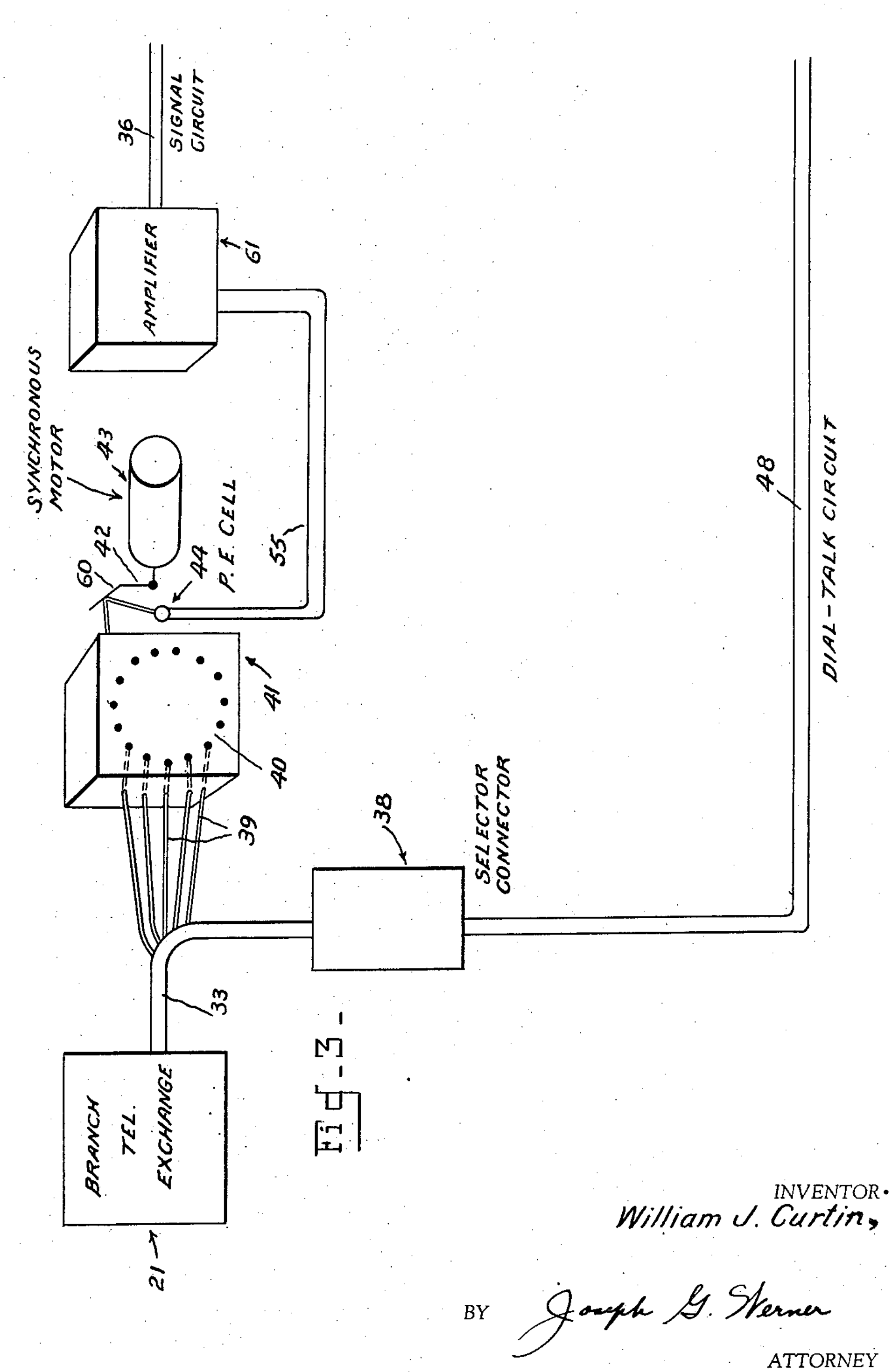
Fig. 3 is a schematic view of one means for adapting standard telephone company equipment for use in a branch telephone answering system exchange.

With reference to Fig. 3 the scanning unit as used within the telephone answering service substation is shown in greater detail. As pointed out heretofore the branch telephone exchange 21, the multiple cables 33, the selector-connector 38, jumper wires 39, the dial-talk circuit 48, and the board 40 either house or comprise standard telephone equipment. The means for scanning includes the synchronous motor 43 its scanning arm 42 having reflecting surface 60, photo-electric cell 44 and the amplifier 61. In this figure light is shown projecting from one of lights 41 in board 40 to the reflecting surface 60 of scanning arm 42 of synchronous motor 43 to photo-electric cell 44. Photo-electric cell 44 is connected to the amplifier 61 by means of wires 55. This figure clearly shows the demarcation of telephone company equipment from that provided by the telephone answering system as proposed in the present invention.

Figure 4:
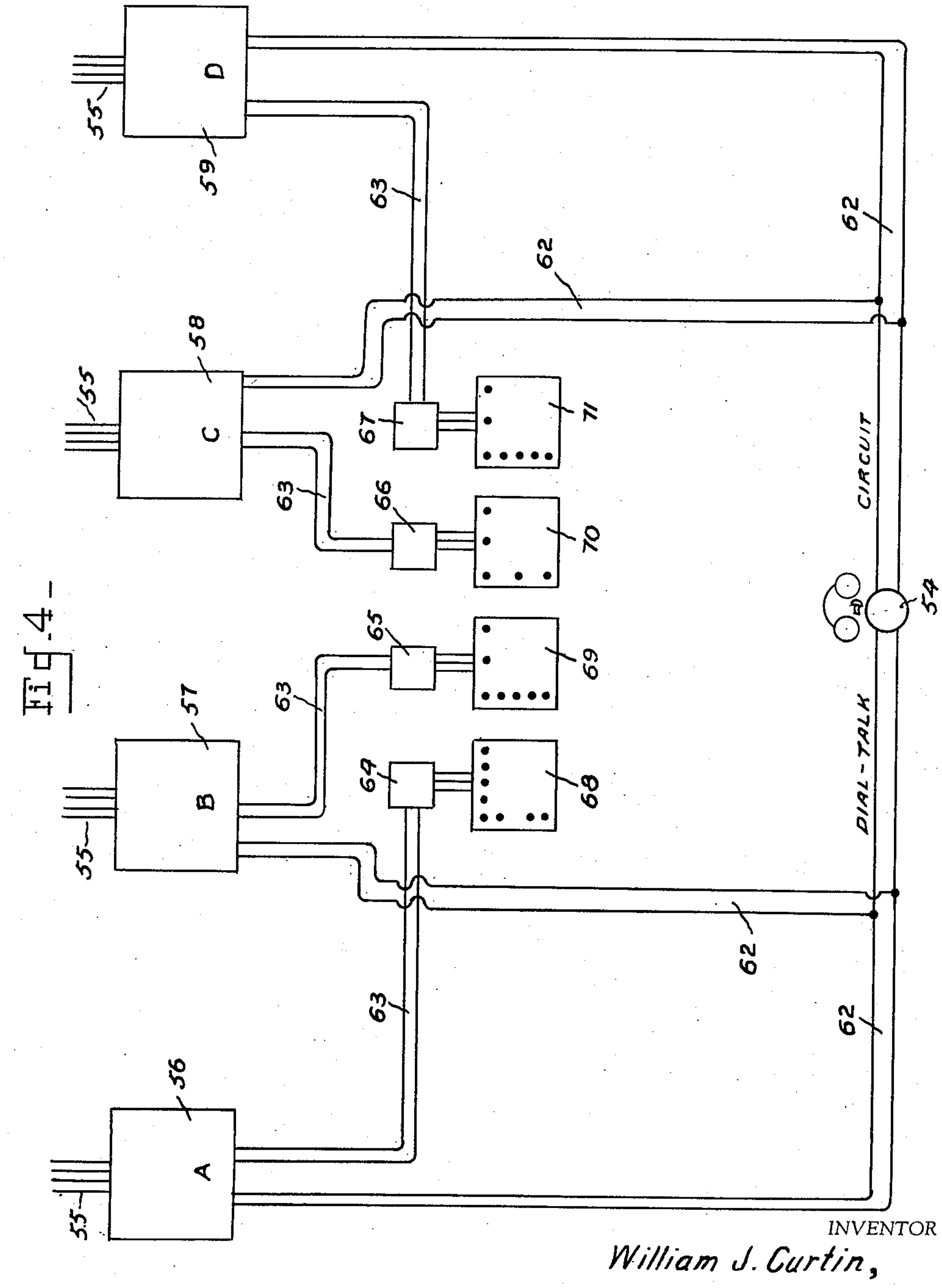
Fig. 4 is a schematic view of the relationship between several telephone answering system substations and a telephone answering system's central office.

The present invention is not only a means of reducing the overhead in operating a telephone answering service for a community having two or more telephone exchanges in that the excessive cable rates are kept at a minimum but also in that personnel may be held to the lowest possible figure. This can further be illustrated by the situation in communities having several central answering service exchanges. During certain periods of the day the number of calls may justify the employment of personnel at such exchanges and operation of such exchanges as central answering service exchanges. However, during hours when telephones are least used, usually known as the "graveyard shift," it often becomes uneconomic to maintain telephone secretaries at each of such central stations. By use of this invention such central answering service exchanges may be converted to branch answering service exchanges during such off-peak periods, and the calls of such exchanges handled, by one central answering service exchange, as schematically shown in Figure 4. This factor alone, saving multiple wages at off-peak hours, points up in the degree of utility for the present invention. In Fig. 4, 55 generally indicates the multiple circuit cables coming from the branch telephone exchanges to the telephone answering system's substations 56, 57, 58 and 59. Dial-talk circuits 62 connect the central telephone answering service office to the substations, whereas signal circuits 63 link the substations to the signal receiving unit 64, 65, 66 and 67 and light boards 68, 69, 70 and 71 within the central telephone answering system's office. It is readily apparent therefore that a single operator using dial and key 54 can select any dial-talk circuit to any of the stations, thus, providing service for each of such stations and their respective telephone exchanges.

From the foregoing it will now be readily understood that any call coming in to a branch telephone answering system exchange is transmitted directly and substantially immediately to the central answering service exchange resulting in a connection by means of which a subscriber or client's telephone may be promptly answered, regardless of the exchange with which it is associated, and that by virtue of the system of the instant invention this may be accomplished without the necessity of utilizing multiple circuit carrying means over long distances and at consequent high cost.

Although the present invention has been illustrated using electronic to mechanical means, in that the scanning device in the substations uses electronic means, whereas in the central telephone answering office mechanical signal receiving means are proposed, the broad concept of the invention is not intended to be limited to this combination of devices alone. Electronic means may be used in both the substations and the central offices as may mechanical means; in addition mechanical means may be used in the substation and electronic means in the central office, the reverse of that now illustrated. The broad concept of this invention includes these modifications which may be readily substituted.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a telephone answering system for a telephone system including a central telephone exchange and a branch telephone exchange remote therefrom, a central telephone answering service exchange proximate to said central telephone exchange, a branch telephone answering service proximate to said branch telephone exchange, means carrying a multiplicity of circuits connecting said branch telephone exchange and said branch answering service exchange, a board including a plurality of selectively illuminable lights in said branch answering service exchange, a photo-electric scanning unit associated with said board, means carrying a multiplicity of circuits connecting said central telephone exchange to said central answering service exchange, a second board including a plurality of selectively illuminable lights in said central answering service exchange corresponding to said first board, a signal receiving unit synchronized with said photo-electric scanning unit associated with said second board, single circuit means connecting said photo-electric scanning unit with said signal receiving unit directly and independently of said multiple circuit carrying means, and a dial-talk circuit between the central answering service exchange and the branch answering service exchange.

2. In a telephone answering system for a telephone system including a central telephone exchange and a plurality of branch telephone exchanges remote from said central exchange, a central answering service exchange proximate to said central telephone exchange, a plurality of branch answering service exchanges each proximate to one of said branch telephone exchanges, means carrying a multiplicity of circuits connecting each branch telephone exchange and its associated branch answering service exchange, a board including a plurality of selectively illuminable lights in each branch answering service exchange, a photo-electric scanning unit associated with each board, means carrying a multiplicity of circuits connecting said central telephone exchange to said central answering service exchange, a central board including a plurality of selectively illuminable lights in said central answering service exchange corresponding to all of said branch answering service exchange boards, central signal receiving means synchronized with each of said branch photo-electric scanning units associated with said central board, signal circuit means connecting said central signal receiving means with each of said branch photo-electric scanning units directly and independently of said multiple circuit carrying means, and a dial-talk circuit between the central answering service exchange and each branch answering service exchange, and hence any telephone served by the latter.

3. In a telephone answering system for a telephone system including a central telephone exchange and a branch telephone exchange remote therefrom, a central telephone answering service exchange proximate to said central telephone exchange, a branch telephone answering service exchange proximate to said branch telephone exchange, means carrying a multiplicity of circuits connecting said branch telephone exchange and said branch answering service exchange, a board including a plurality of selectively illuminable lights in said branch answering service exchange, a photo-electric scanning unit associated with said board, means carrying a multiplicity of circuits connecting said central telephone exchange to said central answering service, a second board including a plurality of selectively illuminable lights in said central answering service exchange corresponding to said first board, a second photo-electric scanning unit synchronized with said first photo-electric scanning unit associated with said second board, single circuit means connecting said first photo-electric scanning unit with said second photo-electric scanning unit directly and independently of said multiple circuit carrying means, and a dial-talk circuit between the central answering service exchange and the branch answering service exchange.

4. In a telephone answering system for a telephone system including a central telephone exchange and a branch telephone exchange remote therefrom, a central telephone answering service exchange proximate to said central telephone exchange, a branch telephone answering service exchange proximate to said branch telephone exchange, means carrying a multiplicity of circuits connecting said branch telephone exchange and said branch answering service exchange, a board including a plurality of selectively illuminable lights in said branch answering service exchange, a signal sending unit associated with said board, means carrying a multiplicity of circuits connecting said central telephone exchange to said central answering service, a second board including a plurality of selectively illuminable lights in said central answering service exchange corresponding to said first board, a photo-electric scanning unit synchronized with said signal sending unit associated with said second board, single circuit means connecting said signal sending unit with said photo-electric scanning unit directly and independently of said multiple circuit carrying means, and a dial-talk circuit between the central answering service exchange and the branch answering service exchange.

5. In a telephone answering system for a telephone system including a central telephone exchange and a branch telephone exchange remote therefrom, a central telephone answering service exchange proximate to said central telephone exchange, a branch telephone answering service exchange proximate to said branch telephone exchange, means carrying a multiplicity of circuits connecting said branch telephone exchange and said branch answering service exchange, a commutator including a plurality of selective contacts in said branch answering service exchange, a signal sending unit associated with said commutator, means carrying a multiplicity of circuits connecting said central telephone exchange to said central answering service, a board including a plurality of selectively illuminable lights in said central answering service exchange corresponding to said commutator, a signal receiving unit synchronized with said signal sending unit associated with said board, single circuit means connecting said signal sending unit with said signal receiving unit directly and independently of said multiple circuit carrying means, and a dial-talk circuit between the central answering service exchange and the branch answering service exchange.

6. In a telephone system including a pair of telephone exchanges, an answering exchange proximate each of said telephone exchanges, means comprising a multiplicity of subscriber's lines connecting each telephone exchange with its associated answering exchange, means in one of said answering exchanges responsive to calling signals on the subscriber's lines entering such answering exchange, connecting means connecting said calling signal responsive means in said one answering exchange with indicating means in said other answering exchange, and a call-talk circuit connecting said one answering exchange with said other answering exchange.

7. In a telephone system including a plurality of telephone exchanges, an answering exchange proximate to each of said telephone exchanges, one of said answering exchanges being a central answering exchange and the rest of said answering exchanges being branch answering exchanges, means comprising a multiplicity of subscriber's lines connecting each telephone exchange with its associated answering exchange, means in each branch answering exchange responsive to calling signals on said subscriber's lines, connecting means connecting said calling signal responsive means in each branch answering exchange with indicating means in said central answering exchange, and a dial-talk circuit connecting each branch answering exchange with said central answering exchange.

8. In a telephone system including a central telephone exchange and a branch telephone exchange, an answering exchange proximate each of said telephone exchanges, means comprising a multiplicity of subscriber's lines connecting each telephone exchange with its associated answering exchange, indicating means in one of said answering exchanges for indicating which of said subscriber's lines entering said station is being signalled, means to transfer such indication from said one answering exchange to the other answering exchange, and a dial-talk circuit connecting said answering exchanges.

9. In a telephone system including a central telephone exchange and a branch telephone exchange, an answering exchange proximate each of said telephone exchanges, means comprising a multiplicity of subscriber's lines connecting each telephone exchange with its associated answering exchange, indicating means in one of said answering exchanges for indicating which of said subscriber's lines entering said station is being signalled, a single circuit means to transfer such indication directly from said one answering exchange to the other answering exchange independently of said subscriber's lines, and a call-talk circuit connecting said answering exchanges.

10. In a telephone system including a central telephone exchange and a branch telephone exchange, an answering exchange proximate each of said telephone exchanges, means comprising a multiplicity of subscriber's lines connecting each telephone exchange with its associated answering exchange, a plurality of illuminable lights in one of said answering exchanges for indicating which of said subscriber's lines entering said answering exchange is being signalled, a scanning means associated with said lights, a signal receiving means in the other of said answering exchanges, a single circuit means connecting said scanning means with said signal receiving means directly and independently of said subscriber's lines, and a dial-talk circuit between said answering exchanges.

11. In a telephone system including a pair of telephone exchanges, an answering exchange proximate each of said telephone exchanges, means comprising a multiplicity of subscriber's lines connecting each telephone exchange with its associated answering exchange, means in one of said answering exchanges responsive to calling signals on the subscriber's lines entering such answering exchange, single circuit connecting means connecting said calling signal responsive means in said one answering exchange directly to indicating means in said other answering exchange independently of said subscriber's lines, and a dial-talk circuit connecting said one answering exchange with said other answering exchange.

References Cited in the file of this patent

UNITED STATES PATENTS

| Number | Name | Date |
|---|---|---|
| 2,379,715 | Hubbard | July 3, 1945 |